(12) United States Patent
Kimerling et al.

(10) Patent No.: US 8,837,877 B2
(45) Date of Patent: Sep. 16, 2014

(54) PATTERNED NON-RECIPROCAL OPTICAL RESONATOR

(75) Inventors: Lionel C. Kimerling, Concord, MA (US); Caroline A. Ross, Arlington, MA (US); Lei Bi, Cambridge, MA (US); Peng Jiang, Cambridge, MA (US); Juejun Hu, Cambridge, MA (US); Dong Hun Kim, Cambridge, MA (US); Gerald F. Dionne, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 465 days.

(21) Appl. No.: 13/208,002

(22) Filed: Aug. 11, 2011

(65) Prior Publication Data

US 2013/0039618 A1    Feb. 14, 2013

(51) Int. Cl.
| | |
|---|---|
| G02B 6/28 | (2006.01) |
| G02B 6/26 | (2006.01) |
| G02B 6/27 | (2006.01) |
| G02F 1/00 | (2006.01) |
| H01F 41/14 | (2006.01) |
| G02F 1/313 | (2006.01) |
| G02F 1/095 | (2006.01) |
| G02F 1/361 | (2006.01) |
| G02B 6/12 | (2006.01) |

(52) U.S. Cl.
CPC ............. *G02F 1/0955* (2013.01); *H01F 41/14* (2013.01); *G02F 1/3132* (2013.01); *G02F 1/3611* (2013.01); *G02B 6/12004* (2013.01); *G02B 6/12007* (2013.01); *G02F 1/361* (2013.01); *G02F 1/095* (2013.01)

USPC .................... 385/32; 385/24; 385/27; 385/50; 385/129; 385/131; 385/132; 438/31; 427/128

(58) Field of Classification Search
CPC  G02B 6/12004; G02B 6/12007; G02F 1/095; G02F 1/361; G02F 1/3611; H01F 41/14
USPC ........... 385/11, 14, 15, 24, 27, 31, 32, 39, 42, 385/50, 129–132, 141; 427/127–128, 131, 427/598; 438/31
See application file for complete search history.

(56) References Cited

U.S. PATENT DOCUMENTS

| | | | |
|---|---|---|---|
| 7,215,848 | B2 | 5/2007 | Tan et al. |
| 8,396,337 | B2 * | 3/2013 | Kroemer et al. ................ 385/27 |
| 2008/0267557 | A1 | 10/2008 | Wang et al. |
| 2010/0238536 | A1 | 9/2010 | Hu et al. |

OTHER PUBLICATIONS

Zaman, "Semiconductor Waveguide Isolators" Journal of Lightwave Technology, vol. 26, No. 2, Jan. 15, 2008, pp. 291-301.

(Continued)

*Primary Examiner* — Uyen Chau N Le
*Assistant Examiner* — Michael Mooney
(74) *Attorney, Agent, or Firm* — Gesmer Updegrove LLP

(57) ABSTRACT

A patterned nonreciprocal optical resonator structure is provided that includes a resonator structure that receives an optical signal. A top cladding layer is deposited on a selective portion of the resonator structure. The top cladding layer is patterned so as to expose the core of the resonator structure defined by the selective portion. A magneto-optically active layer includes a magneto-optical medium being deposited on the exposed core of the resonator structure so as to generate optical non-reciprocity.

22 Claims, 4 Drawing Sheets

(56) References Cited

OTHER PUBLICATIONS

Auracher et al., "A New Design for an Integrated Optical Isolator" Optics Communications, vol. 13, No. 4, Apr. 1975, pp. 435-438.

Kono et al., "Nonreciprocal micro-ring resonator for the miniaturization of optical waveguide isolators" IMD3, 2006 OSA/IPRA.

Kono et al., "Nonreciprocal microresonators for the miniaturization of optical waveguide isolators" Optics Express, vol. 15, No. 12, Jun. 11, 2007.

\* cited by examiner

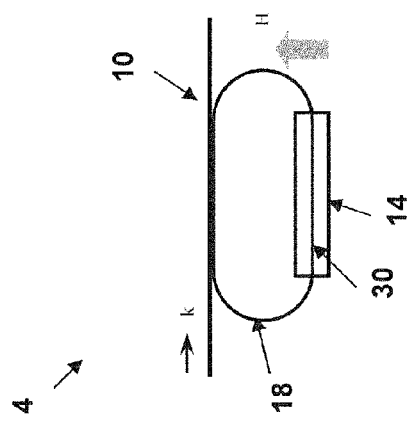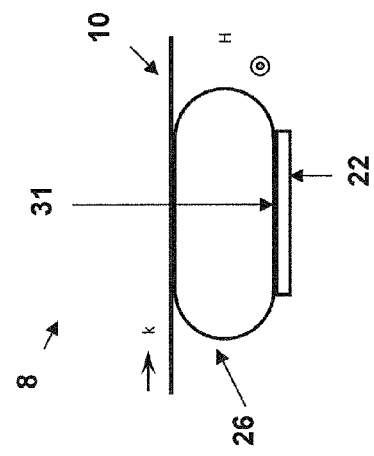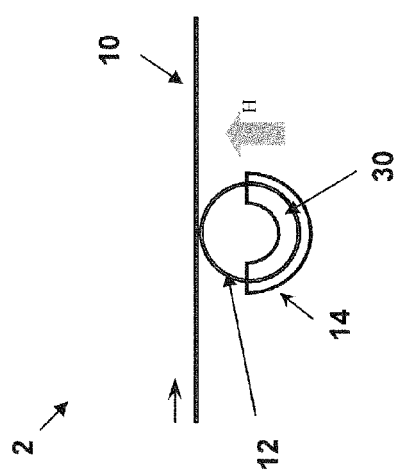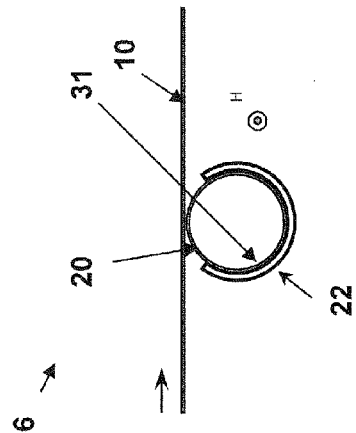
FIG. 1A
FIG. 1B

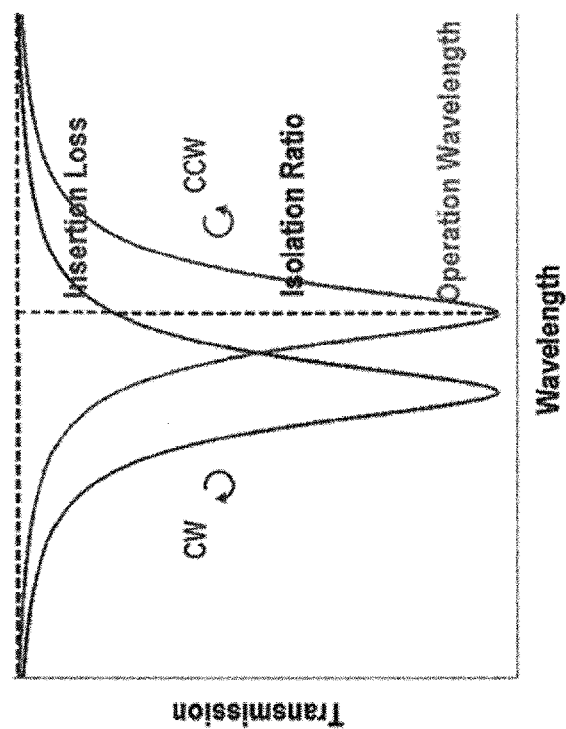

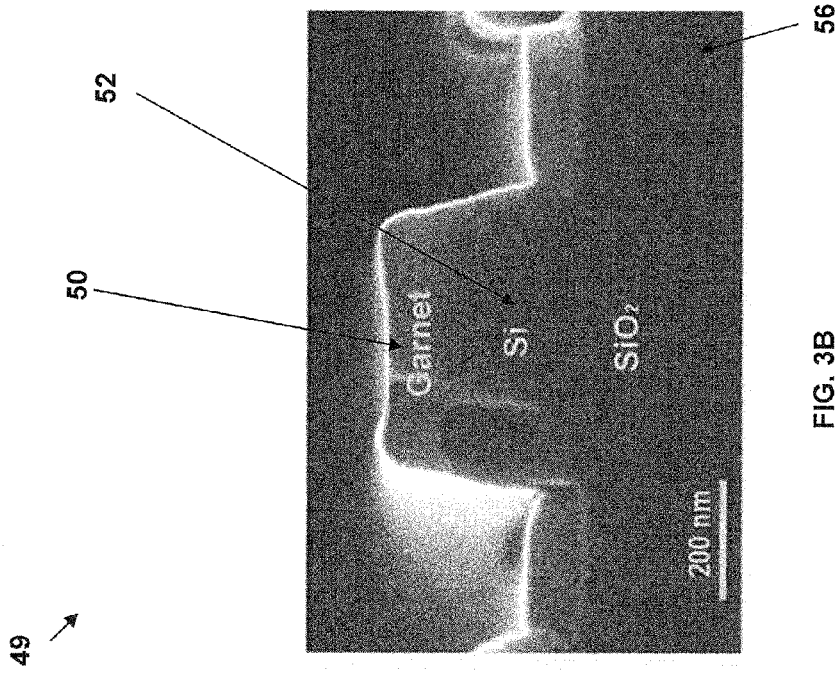
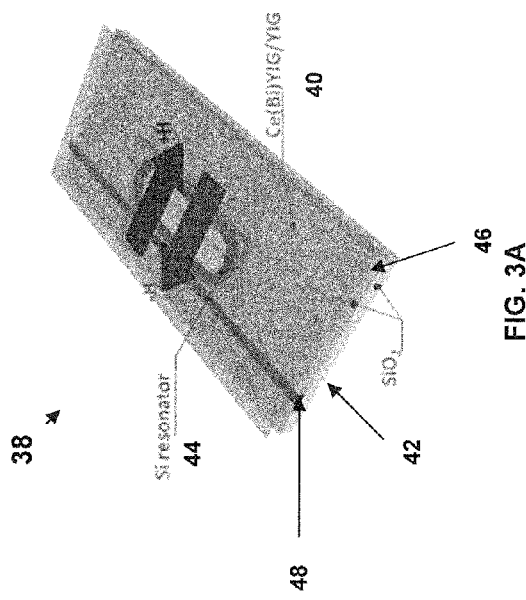
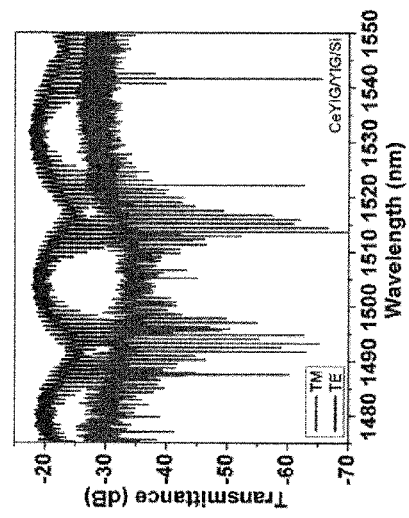
FIG. 3A
FIG. 3B
FIG. 3C

PATTERNED NON-RECIPROCAL OPTICAL RESONATOR

BACKGROUND OF THE INVENTION

The invention is related to the field of optical resonators, and in particular to a device structure of patterned nonreciprocal optical resonators for integrated optical isolator applications.

An isolator is a device that allows polarized light to pass through in one direction, but not in the opposite direction (like a one-way valve or diode). Optical isolators are indispensible devices in optical communication systems which prevent laser degradation, optical crosstalk and signal instability due to back scattering. Conventional bulk optical isolators used in optical communication at around 1550 nm wavelength are based on the Faraday effect, in which a magnetooptical single crystal of $(Bi,Y)_3Fe_5O_{12}$ (garnet) is placed in the path of the light providing this effect, together with a polarizer and analyzer with their propagation angles at 45° to each other, in front and behind the crystal respectively. The forward light is linearly polarized through the first polarizer. Then the polarization direction is rotated 45° after passing through the magnetized garnet crystal and the light can pass through the analyzer. In contrast, the reflected light has its polarization direction rotated 45° due to the non-reciprocity of the garnet crystal and is blocked by the initial polarizer.

With the development of silicon photonics and increasing of the scale of integration photonic circuits, integration of optical isolators is becoming increasingly urgent. Currently, monolithic integration of an optical isolator on a semiconductor platform remains challenging for integrated photonic systems. Optical isolators based on Mach-Zehnder structure have been proposed and demonstrated on a garnet substrate platform. However such devices usually require larger footprint compared with the Faraday isolator counterpart owing to the weaker magneto-optical nonreciprocal phase shift (NRPS) effect in a Mach-Zehnder configuration. In order to reduce the device footprint and enable the integration of optical isolators on a semiconductor platform, devices based on optical resonance have been proposed. Using resonance structures such as ring resonators or photonic crystals, the footprint of optical isolators were expected to significantly reduce from millimeter to micron meter level.

However, all previously proposed device structures either require patterning and etching of the magneto-optical materials, or engineering the magnetic domain structures of the magneto-optical materials, or engineering a non-homogenous applied magnetic field on the resonator structure, which are highly fabrication unfriendly. Until now the functionality of these devices has not been demonstrated experimentally due to fabrication difficulties. Therefore, it is highly desired that a fabrication friendly, monolithically integrated device structure which uses homogenous magnetic field and magneto-optical material can be developed for optical isolation applications.

SUMMARY OF THE INVENTION

According to one aspect of the invention, there is provided a patterned nonreciprocal optical resonator structure. The patterned nonreciprocal optical resonator structure includes a resonator structure that receives an optical signal. A top cladding layer is deposited on a selective portion of the resonator structure. The top cladding layer is patterned so as to expose the core of the resonator structure defined by the selective portion. A magneto-optically active layer includes a magneto-optical medium being deposited on the exposed core of the resonator structure so as to generate optical non-reciprocity.

According to another aspect of the invention, there is provided a method of forming a patterned nonreciprocal optical resonator structure. The method includes providing a resonator structure that receives an optical signal. A top cladding layer is deposited on a selective portion of the resonator structure. The top cladding layer is patterned so as to expose the core of the resonator structure defined by the selective portion. Also, the method includes depositing a magneto-optically active layer having a magneto-optical medium on the exposed core of the resonator structure so as to generate optical non-reciprocity.

BRIEF DESCRIPTION OF THE DRAWINGS

FIGS. 1A-1B are schematic diagrams illustrating the inventive patterned nonreciprocal optical resonator structure used for TM mode and TE mode optical isolation;

FIG. 2 is a graph illustrating optical isolation being achieved in the inventive patterned optical resonator structure by lifting the degeneracy of clockwise and counter-clockwise;

FIGS. 3A-3B are graphs and cross-sectional SEM image of the inventive patterned nonreciprocal optical resonator structure; FIG. 3C is a graph illustrating the transmission spectrum of the inventive patterned nonreciprocal optical resonator structure.

DETAILED DESCRIPTION OF THE INVENTION

Figure 4B:
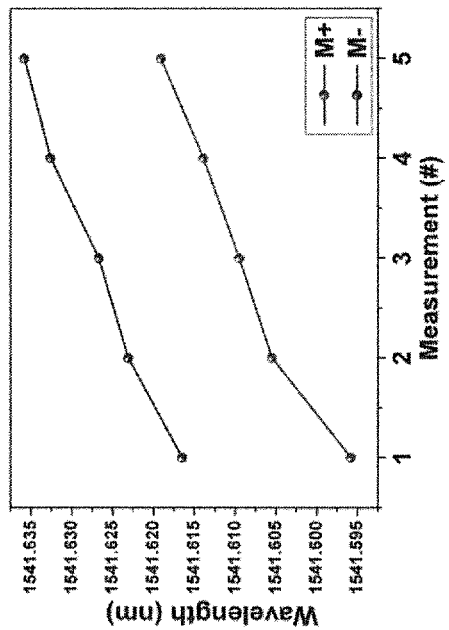
FIG. 4B is a graph illustrating the measured peak positions of the resonance peak position with opposite magnetization directions.

The invention involves a patterned nonreciprocal optical resonator structure for monolithically integrated optical isolators on a semiconductor platform, in which no patterning or etching steps are required for the magneto-optical materials, and a uniform magnetic field can be used.

FIGS. 1A-1B are schematic diagrams illustrating the inventive patterned nonreciprocal optical resonator structure. FIG. 1A shows a top view of two patterned optical resonator structures 2, 4 having a micro-ring resonator 12 and racetrack resonator 18 comprising semiconductor compatible materials, such as Si, $Si_3N_4$, SiON, SiGe, GaAs, Si, $SiO_xN_y$, polymers, chalcogenide glasses InP, and/or III-V semiconductors, evanescently coupled to a bus waveguide 10. Also, other resonator structures such as microdisks can be used. The patterned optical resonator structures 2, 4 are then covered with top-cladding layers 14 which includes a low index material compared to the resonator core. The top cladding layers 14 are then patterned and etched to expose part of the resonator core material. Magneto-optically active layers 30, such as magnetic oxides including magnetic garnets, spine's, perovskites, paramagnetic semiconductors (InP:Fe for instance), and/or magnetic semiconductors, is deposited onto the overall active area. Due to the patterned structure arrangement, the optical mode is evanescently coupled to the magneto-optically active layer 30 only in the etched region, whereas outside this region the optical mode does not couple into the magneto-optical material due to the presence of the top cladding layers 14. With a macroscopic applied magnetic field H as shown, the magneto-optical nonreciprocal phase shift accumulates in TM polarized light in the patterned optical resonator structures 2, 4. The degeneracy of forward and backward resonant wavelength is lifted and optical isolation is achieved. The magneto-optically active layer is not patterned or etched to avoid contamination and excess loss.

The invention allows for patterned optical resonator structures 6, 8 to operate with TE polarized light. The patterned optical resonator structures 6, 8 are then covered with top-cladding layers 22 which includes a low index material compared to the resonator core. As shown in FIG. 1B, an etch process is carried out in the top-cladding layers 22 to open a window beside the resonator core. Magneto-optically active layers 31, such as magnetic oxides including magnetic garnets, spinels, perovskites, paramagnetic semiconductors (InP:Fe for instance) and/or magnetic semiconductors, is deposited onto the overall active area. Again the optical mode is evanescently coupled to the magneto-optical material only at the etched regions. When applying a magnetic field perpendicular to the device plane, the magneto-optical nonreciprocal phase shift accumulates in TE polarized light in this structure. The degeneracy of forward and backward resonant wavelength is lifted and optical isolation is achieved. Due to the patterned structure arrangement, there is no etching or magnetic domain structure engineering process required on the magneto-optical material and a homogenous magnetic field can be used.

FIG. 2 is a graph illustrating optical isolation being achieved in the inventive patterned optical resonator structure by lifting the degeneracy of clockwise and counter-clockwise resonance modes. For a magneto-optical material with Faraday rotation constant of $\Theta_F$ deposited on the patterned region, the split of the resonance wavelength $\Delta\lambda$ and the figure of merit (FOM) of the inventive patterned optical resonator structure (determined by the split of resonance divided by the full width of maximum of the resonance peak) can be simulated numerically. When the patterned region is magnetized perpendicular to the light propagation direction, an non-reciprocal phase shift (NRPS) is achieved in the TM polarized light as defined by: $\Delta\beta^{TM} = \beta^{TM}(CCW) - \beta^{TM}(CW)$, whereas $\beta^{TM}(CCW)$ and $\beta^{TM}(CW)$ are the TM mode propagation constant in the clockwise and counter-clockwise configurations respectively. $\Delta\beta^{TM}$ is proportional to the Faraday rotation constant of the deposited magneto-optical material.

Considering the patterned region has a length fraction of f with respect to the resonator cavity length, the split of the resonance wavelength can be expressed by $$\Delta\lambda = \frac{FSR \cdot L_1 \Delta\beta}{2\pi},$$

where $L_1$ is the length of magneto-optical waveguide sections in the resonator, FSR is the free spectrum range of the resonator. FSR can be determined by $$FSR = \frac{\lambda_r^2}{L_0 n_{g0} + L_1 \lambda_{g1}},$$

with $L_0$ standing for the non-magneto-optical waveguide section length, and $n_{g0}$, $n_{g1}$ standing for the group index of the non-magneto-optical waveguide and magneto-optical waveguide sections respectively. The overall loss of the resonator is $\alpha = (\alpha_0 L_0 + \alpha_1 L_1 + 2\alpha_{junction})/L$, and the quality factor is $$Q = \frac{\pi(L_0 n_{g0} + L_1 n_{g1})}{\lambda_r \alpha L}.$$

The figure of merit is therefore expressed by $$F_{res.} = \frac{L_1 \Delta\beta_{TM}}{\alpha L}.$$

When the magneto-optical waveguide loss is dominating, the overall loss is proportional to $L_1$, and the figure of merit is simplified as $$F_{res.} = \frac{L_1 \Delta\beta_{TM}}{\alpha_1 L_1} = \frac{\Delta\beta_{TM}}{\alpha_1}.$$

This expression states that, when fabrication loss of the resonator is minimized, the inventive patterned optical resonator structure conserves the FOM of the magneto-optical waveguide. Also, the inventive patterned optical resonator structure footprint is only defined by the resonator structure size. Therefore as long as the FOM of the deposited magneto-optical material is high enough, optical isolation can be achieved the compact patterned optical resonator structure.

To demonstrate the inventive patterned optical resonator structure 38, a silicon racetrack resonator 44 with one arm patterned and deposited with $CeY_2Fe_5O_{12}$(80 nm)/$Y_3Fe_5O_{12}$ (20 nm) polycrystalline layers 40 is fabricated on a top cladding layer 46 having silicon dioxide layer or other materials comprising $SiO_x$, as shown in FIG. 3A. A bus waveguide 48 is coupled to the resonator 44. The resonator 44 is fabricated on an under cladding layer 42 comprising silicon dioxide layer 42. The under cladding 42 can be positioned on a Si, SOI, GOI, GaAs, InP substrate, or the like. The under cladding 42 can include $SiO_x$, $SiO_xN_y$, polymers, chalcogenide glasses or III-V semiconductors showing lower index of refraction compared to the waveguide core material. The cross-section SEM image of the patterned region 49 is shown in FIG. 3B. A garnet layer 50 is found to be in contact with the silicon waveguide core 52 with a thickness of approximately 250 nm. The garnet 50 and core 52 are positioned on a under cladding layer having silicon dioxide layer 56. The transmission spectrum of this patterned structure 38 is shown in FIG. 3C. Resonance spectra with a quality factor of Q=6,000 and Q=4,800 were observed in the TM and TE polarized light respectively. When applying a macroscopic magnetic field of 1,500 Oe across the patterned structure 38 along opposite directions, the resonance peak shifts to different wavelengths. This is equivalent to the CCW and CW mode resonance peak positions if the magnetic field is applied to one direction.

Figure 4A:
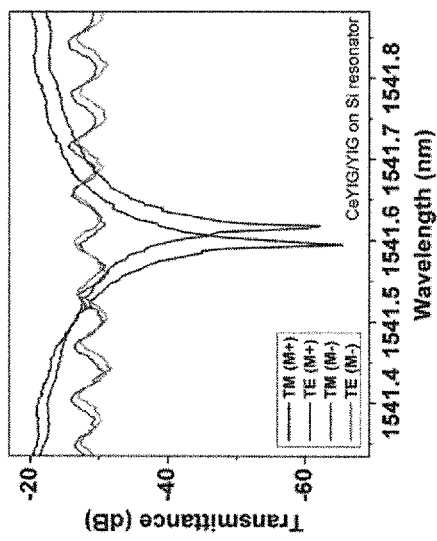
FIG. 4A is a graph illustrating the transmission spectrum of a resonance peak near 1550 nm wavelength with opposite magnetization direction.

The experimentally measured spectrum of a resonance peak near 1550 nm is shown in FIG. 4A, where M+ and M− corresponding to two opposite magnetization directions of the device. Reversibility of this observation is confirmed by flipping the magnetic field and re-measuring 5 times. As shown in FIG. 4B, the measured resonance peak positions reversibly appear at different positions for different magnetization directions confirming the observation of a magneto-optical NRPS. The current invention provides an isolation ratio of 19.5±2.5 dB and insertion loss of 18.8±1.1 dB. Further improvement of materials and patterned optical resonator structure can deer ease the insertion loss and enhance the device performance. This patterned optical resonator structure design is non-material selective, therefore other high FOM materials such as magnetic oxides and magnetic semiconductors can be incorporated in the same way to yield improved device performance.

Although the present invention has been shown and described with respect to several preferred embodiments thereof, various changes, omissions and additions to the form and detail thereof, may be made therein, without departing from the spirit and scope of the invention.

What is claimed is:

1. A patterned nonreciprocal optical resonator structure comprising:
    a resonator structure that receives an optical signal;
    a top cladding layer that is deposited on a selective portion of the resonator structure, the top cladding layer is patterned so as to expose the core of the resonator structure defined by the selective portion; and
    a magneto-optically active layer that includes a magneto-optical medium that is deposited on the exposed core of the resonator structure so as to generate optical non-reciprocity.

2. The patterned nonreciprocal optical resonator structure of claim 1, wherein the resonator structure comprises a micro-ring, a micro-disk, or a racetrack-type resonator.

3. The patterned nonreciprocal optical resonator structure of claim 1, wherein the top cladding layer is patterned so that the application of a unidirectional magnetic field perpendicular to the light propagation direction leads to optical non-reciprocity.

4. The patterned nonreciprocal optical resonator structure of claim 1, wherein the magneto-optically active layer is not patterned or etched to avoid contamination and excess loss.

5. The patterned nonreciprocal optical resonator structure of claim 1, wherein said resonator structure comprises Si, $Si_3N_4$, SiON, SiGe, GaAs, Si, $SiO_xN_y$, polymers, chalcogenide glasses InP, and/or III-V semiconductors.

6. The patterned nonreciprocal optical resonator structure of claim 1, wherein the magneto-optically active layer comprises magnetic garnets, spinels, perovskites, paramagnetic semiconductors, magnetic oxides and/or magnetic semiconductors.

7. The patterned nonreciprocal optical resonator structure of claim 1, wherein the resonator structure, top cladding layer, and magneto-optically active layer are positioned on an undercladding layer.

8. The patterned nonreciprocal optical resonator structure of claim 7, wherein the undercladding layer is formed on a Si, SOI, GOI, GaAs, or InP substrate.

9. The patterned nonreciprocal optical resonator structure of claim 1 further comprising a bus waveguide that is evanescently coupled to the resonator structure.

10. The patterned nonreciprocal optical resonator structure of claim 7, wherein the undercladding layer comprises $SiO_x$, $SiO_xN_y$, polymers, chalcogenide glasses or III-V semiconductors showing lower index of refraction compared to the waveguide core material.

11. The patterned nonreciprocal optical resonator structure of claim 1, wherein the top-cladding layer comprises a low index material compared to the core of the resonator structure.

12. A method of forming a patterned nonreciprocal optical resonator structure comprising:
    providing a resonator structure that receives an optical signal;
    depositing a top cladding layer on a selective portion of the resonator structure, the top cladding layer is patterned so as to expose the core of the resonator structure defined by the selective portion; and
    depositing a magneto-optically active layer that includes a magneto-optical medium on the exposed core of the resonator structure so as to generate optical non-reciprocity.

13. The method of claim 12, wherein the resonator structure comprises a micro-ring, a micro-disk, or a racetrack-type resonator.

14. The method of claim 12, wherein the top cladding layer is patterned so that the application of a unidirectional magnetic field perpendicular to the light propagation direction leads to optical non-reciprocity.

15. The method of claim 12, wherein the magneto-optically active layer is not patterned or etched to avoid contamination and ensure compatibility with CMOS-backend processing.

16. The method of claim 12, wherein the said resonator structure comprises Si, $Si_3N_4$, SiON, SiGe, GaAs, Si, $SiO_xN_y$, polymers, chalcogenide glasses InP, and/or III-V semiconductors.

17. The method of claim 12, wherein the magneto-optically active layer comprises magnetic garnets, spinels, perovskites, paramagnetic semiconductors, magnetic oxides and/or magnetic semiconductors.

18. The method of claim 12, wherein the resonator structure, top cladding layer, and magneto-optically active layer are positioned on an undercladding layer.

19. The method of claim 18, wherein the undercladding layer is formed on a Si, SOI, GOI, GaAs, or InP substrate.

20. The method of claim 12 further comprising a bus structure that is evanescently coupled to the resonator structure.

21. The method of claim 18, wherein the undercladding layer comprises $SiO_x$, $SiO_xN_y$, polymers, chalcogenide glasses or III-V semiconductors showing lower index of refraction compared to the waveguide core material.

22. The method of claim 12, wherein the top-cladding layer comprises a low index material compared to the core of the resonator structure.

* * * * *